United States Patent
Han et al.

(10) Patent No.: US 10,912,045 B2
(45) Date of Patent: Feb. 2, 2021

(54) METHOD FOR ACQUIRING AND REPORTING SYNCHRONIZATION INFORMATION OF NEIGHBORING CELL, BASE STATION, USER EQUIPMENT AND MEDIUM

(71) Applicant: SPREADTRUM COMMUNICATIONS (SHANGHAI) CO., LTD., Shanghai (CN)

(72) Inventors: Chuanhua Han, Shanghai (CN); Yun Deng, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/123,399

(22) Filed: Sep. 6, 2018

(65) Prior Publication Data
US 2019/0082401 A1    Mar. 14, 2019

(30) Foreign Application Priority Data
Sep. 8, 2017    (CN) .......................... 2017 1 0809540

(51) Int. Cl.
*H04W 56/00* (2009.01)
*H04W 76/27* (2018.01)
*H04W 36/00* (2009.01)

(52) U.S. Cl.
CPC ..... *H04W 56/001* (2013.01); *H04W 36/0061* (2013.01); *H04W 56/00* (2013.01); *H04W 76/27* (2018.02)

(58) Field of Classification Search
CPC .............. H04W 56/001; H04W 76/27; H04W 36/0061; H04W 56/00
See application file for complete search history.

(56) References Cited

U.S. PATENT DOCUMENTS

2013/0229953 A1* 9/2013 Nam ................ H04W 72/0426
370/280
2018/0213493 A1* 7/2018 Chakraborty ....... H04W 56/001

FOREIGN PATENT DOCUMENTS

| CN | 101990257 A | 3/2011 |
| CN | 102131207 A | 7/2011 |

(Continued)

OTHER PUBLICATIONS

CNIPA First Office Action for corresponding CN201710809540.8; dated Mar. 3, 2020.

*Primary Examiner* — Pao Sinkantarakorn
*Assistant Examiner* — Kabir U Jahangir
(74) *Attorney, Agent, or Firm* — Cantor Colburn LLP

(57) ABSTRACT

A method for acquiring and reporting synchronization information of the at least one neighboring cell, a base station, a user equipment and a medium are provided, wherein the method for acquiring synchronization information of at least one neighboring cell: transmitting an RRC signaling to a UE to request the UE to report the synchronization information of the at least one neighboring cell, wherein the RRC signaling indicates what synchronization information of the at least one neighboring cell needs to be reported by the UE; and receiving the synchronization information of the at least one neighboring cell from the UE by an RRC signaling. The base station may acquire the synchronization information of the at least one neighboring cell, and the synchronization information is used in a subsequent measurement configuration process of other UEs, which reduces the measurement overhead.

14 Claims, 3 Drawing Sheets an RRC signaling is transmitted to a UE, to request the UE to report the synchronization information of at least one neighboring cell, wherein the RRC signaling indicates what synchronization information of the at least one neighboring cell needs to be reported by the UE — S101 the synchronization information of the at least one neighboring cell is received from the UE by an RRC signaling — S102

(56) References Cited

FOREIGN PATENT DOCUMENTS

| | | | |
|---|---|---|---|
| CN | 102273285 | A | 12/2011 |
| CN | 109379751 | A | 2/2019 |
| WO | 2010078590 | A1 | 7/2010 |
| WO | 2013025069 | A1 | 2/2013 |

* cited by examiner

METHOD FOR ACQUIRING AND REPORTING SYNCHRONIZATION INFORMATION OF NEIGHBORING CELL, BASE STATION, USER EQUIPMENT AND MEDIUM

CROSS-REFERENCE TO RELATED APPLICATIONS

The present application claims priority under 35 U.S.C. § 119 to Chinese Patent Application No. 201710809540.8, filed on Sep. 8, 2017, the entire disclosure of which is incorporated herein by reference.

TECHNICAL FIELD

The present disclosure relates to a communication field, and more particularly, to a method for acquiring synchronization information of at least one neighboring cell, a method for reporting synchronization information of the at least one neighboring cell, a base station, a user equipment and a medium.

BACKGROUND

With the development of a radio communication technology, 3rd Generation Partnership Project (3GPP) introduced a New Radio (NR) technology. In an NR system, a cell may include at least one synchronization signal (SS) block, that is, at least one beam. SS block consists of NR-Primary Synchronization Signal (NR-PSS), NR-Secondary Synchronization Signal (NR-SSS) and NR-Physical Broadcast Channel (NR-PBCH). When a cell includes multiple different SS blocks, the multiple different SS blocks may form an SS burst set. The SS burst set is transmitted periodically with a transmission period of 5 ms, 10 ms, 20 ms, 40 ms, 80 ms or 160 ms. However, in each transmission period, multiple different SS blocks need to be transmitted within 5 ms. A user equipment (UE) may acquire some information about cell synchronization and a cell bandwidth by receiving the SS blocks.

For the UE in a connected state, when a neighboring cell measurement is performed, the UE needs to acquire an SS block time index of a neighboring cell for downlink synchronization and beam identification. The SS block time index is configured to identify a position of the at least one synchronization signal block in the SS burst set. For a neighboring cell synchronized with a serving cell, the UE may use a timing of the serving cell as a timing of the neighboring cell, and does not need to acquire the SS block time index from the neighboring cell. If a neighboring cell that is not synchronized with the serving cell and the UE has not successfully acquired time indexes of any synchronization signal blocks of the neighboring cell, the NR-PBCH of the neighboring cell needs to be read to acquire the SS block time index. The UE acquires, by an instruction of the base station, whether the at least one neighboring cell is synchronized with the serving cell.

However, in many scenarios, the base station cannot know whether the neighboring cell on a certain frequency is synchronized with the serving cell where the UE resides, and cannot provide synchronization indication information to the UE, which causes the UE to be unable to acquire the synchronization indication information even if the neighboring cell is synchronized with the serving cell. Therefore, the UE still needs to read the NR-PBCH of the neighboring cell, which causes high measurement overhead.

SUMMARY

Embodiments of the present disclosure may acquire synchronization information of a neighboring cell of a UE to reduce measurement overhead.

Embodiments of the present disclosure provide a method for acquiring synchronization information of at least one neighboring cell, including: transmitting a radio resource control (RRC) signaling to a UE to request the UE to report the synchronization information of the at least one neighboring cell, wherein the RRC signaling indicates what synchronization information of the at least one neighboring cell needs to be reported by the UE; and receiving the synchronization information of the at least one neighboring cell from the UE by an RRC signaling.

In some embodiments, the at least one neighboring cell includes: at least one neighboring cell on one frequency or on a plurality of frequencies.

In some embodiments, the RRC signaling further indicates predetermined bits configured for reporting the synchronization information of the at least one neighboring cell, and the synchronization information of the at least one neighboring cell that needs to be reported includes at least one following item: whether the at least one neighboring cell being synchronized with a primary cell; whether the at least one neighboring cell being synchronized with a same-frequency serving cell; whether an SS burst set period of the at least one neighboring cell being same with an SS burst set period of the primary cell; whether an SS burst set period of the at least one neighboring cell being same with an SS burst set period of the same-frequency serving cell; whether the at least one neighboring cell being synchronized with each other on a corresponding frequency; and whether the at least one neighboring cell having the same SS burst set period on the corresponding frequency.

In some embodiments, the synchronization information of the at least one neighboring cell further includes: a physical cell identifier of the at least one neighboring cell.

In some embodiments, the synchronization information of the at least one neighboring cell includes at least one following item: a list of neighboring cells synchronized with a primary cell, a list of neighboring cells that are not synchronized with the primary cell, and information of time difference between neighboring cells that are not synchronized with the primary cell and the primary cell; a list of neighboring cells synchronized with a same-frequency serving cell, a list of neighboring cells that are not synchronized with the same-frequency serving cell, and information of time difference between neighboring cells that are not synchronized with the same-frequency serving cell and the same-frequency serving cell; a list of neighboring cells having a same SS burst set period with the primary cell, a list of neighboring cells having a different SS burst set period with the primary cell, and SS burst set periods of neighboring cells having the different SS burst set period with the primary cell; a list of neighboring cells having a same SS burst set period with the same-frequency serving cell, a list of neighboring cells having a different SS burst set period with the same-frequency serving cell, and the SS burst set periods of neighboring cells having the different SS burst set period with the same-frequency serving cell; on a corresponding frequency, a list of neighboring cells synchronized with each other, a list of neighboring cells that are not synchronized with each other, and the information of time difference between neighboring cells that are not synchronized with each other; and on a corresponding frequency, a list of neighboring cells having the same SS burst set period, a list of neighboring cells having different SS burst set periods, and SS burst set periods of neighboring cells having different SS burst set periods.

In some embodiments, the information of time difference includes: a combination of a subframe boundary offset, a subframe number difference, and a System Frame Number (SFN) difference.

Embodiments of the present disclosure provide a method for reporting synchronization information of at least one neighboring cell, including: determining what synchronization information of the at least one neighboring cell needs to be reported; based on the determination result, performing a synchronization detection of the at least one neighboring cell, and acquiring the synchronization information of the at least one neighboring cell; and reporting the synchronization information of the at least one neighboring cell to a base station by an RRC signaling.

In some embodiments, determining what synchronization information of the at least one neighboring cell needs to be reported includes: receiving an RRC signaling from the base station, wherein the RRC signaling indicates what synchronization information of the at least one neighboring cell needs to be reported; and determining what synchronization information of the at least one neighboring cell needs to be reported based on the RRC signaling.

In some embodiments, the at least one neighboring cell includes: at least one neighboring cell on one frequency or on a plurality of frequencies.

In some embodiments, the RRC signaling further indicates predetermined bits configured for reporting the synchronization information of the at least one neighboring cell, and the synchronization information of the at least one neighboring cell that needs to be reported includes at least one following item: whether the at least one neighboring cell being synchronized with a primary cell; whether the at least one neighboring cell being synchronized with a same-frequency serving cell; whether an SS burst set period of the at least one neighboring cell being same with an SS burst set period of the primary cell; whether an SS burst set period of the at least one neighboring cell being same with an SS burst set period of the same-frequency serving cell; whether the at least one neighboring cell being synchronized with each other on a corresponding frequency; and whether the at least one neighboring cell having the same SS burst set period on the corresponding frequency.

In some embodiments, the synchronization information of the at least one neighboring cell further includes: a physical cell identifier of the at least one neighboring cell.

In some embodiments, the synchronization information of the at least one neighboring cell includes at least one following item: a list of neighboring cells synchronized with a primary cell, a list of neighboring cells that are not synchronized with the primary cell, and information of time difference between neighboring cells that are not synchronized with the primary cell and the primary cell; a list of neighboring cells synchronized with a same-frequency serving cell, a list of neighboring cells that are not synchronized with the same-frequency serving cell, and information of time difference between neighboring cells that are not synchronized with the same-frequency serving cell and the same-frequency serving cell; a list of neighboring cells having a same SS burst set period with the primary cell, a list of neighboring cells having a different SS burst set period with the primary cell, and SS burst set periods of neighboring cells having the different SS burst set period with the primary cell; a list of neighboring cells having a same SS burst set period with the same-frequency serving cell, a list of neighboring cells having a different SS burst set period with the same-frequency serving cell, and the SS burst set periods of neighboring cells having the different SS burst set period with the same-frequency serving cell; on a corresponding frequency, a list of neighboring cells synchronized with each other, a list of neighboring cells that are not synchronized with each other, and the information of time difference between neighboring cells that are not synchronized with each other; and on a corresponding frequency, a list of neighboring cells having the same SS burst set period, a list of neighboring cells having different SS burst set periods, and SS burst set periods of neighboring cells having different SS burst set periods.

In some embodiments, the information of time difference includes: a combination of a subframe boundary offset, a subframe number difference, and a SFN difference.

Embodiments of the present disclosure provide a base station, including: a transmitting circuitry, configured to transmit an RRC signaling to a UE to request the UE to report the synchronization information of the at least one neighboring cell, wherein the RRC signaling indicates what synchronization information of the at least one neighboring cell needs to be reported by the UE; and a receiving circuitry, configured to receive the synchronization information of the at least one neighboring cell from the UE by an RRC signaling.

In some embodiments, the at least one neighboring cell includes: at least one neighboring cell on one frequency or on a plurality of frequencies.

In some embodiments, the RRC signaling further indicates predetermined bits configured for reporting the synchronization information of the at least one neighboring cell, and the synchronization information of the at least one neighboring cell that needs to be reported includes at least one following item: whether the at least one neighboring cell being synchronized with a primary cell; whether the at least one neighboring cell being synchronized with a same-frequency serving cell; whether an SS burst set period of the at least one neighboring cell being same with an SS burst set period of the primary cell; whether an SS burst set period of the at least one neighboring cell being same with an SS burst set period of the same-frequency serving cell; whether the at least one neighboring cell being synchronized with each other on a corresponding frequency; and whether the at least one neighboring cell having the same SS burst set period on the corresponding frequency.

In some embodiments, the synchronization information of the at least one neighboring cell further includes: a physical cell identifier of the at least one neighboring cell.

In some embodiments, the synchronization information of the at least one neighboring cell includes at least one following item: a list of neighboring cells synchronized with a primary cell, a list of neighboring cells that are not synchronized with the primary cell, and information of time difference between neighboring cells that are not synchronized with the primary cell and the primary cell; a list of neighboring cells synchronized with a same-frequency serving cell, a list of neighboring cells that are not synchronized with the same-frequency serving cell, and information of time difference between neighboring cells that are not synchronized with the same-frequency serving cell and the same-frequency serving cell; a list of neighboring cells having a same SS burst set period with the primary cell, a list of neighboring cells having a different SS burst set period with the primary cell, and SS burst set periods of neighboring cells having the different SS burst set period with the primary cell; a list of neighboring cells having a same SS burst set period with the same-frequency serving cell, a list of neighboring cells having a different SS burst set period with the same-frequency serving cell, and the SS burst set periods of neighboring cells having the different SS burst set period with the same-frequency serving cell; on a corresponding frequency, a list of neighboring cells synchronized with each other, a list of neighboring cells that are not synchronized with each other, and the information of time difference between neighboring cells that are not synchronized with each other; and on a corresponding frequency, a list of neighboring cells having the same SS burst set period, a list of neighboring cells having different SS burst set periods, and SS burst set periods of neighboring cells having different SS burst set periods.

In some embodiments, the information of time difference includes: a combination of a subframe boundary offset, a subframe number difference, and a SFN difference.

Embodiments of the present disclosure provide a user equipment, including: a determining circuitry, configured to determine what synchronization information of the at least one neighboring cell needs to be reported; an acquiring circuitry, based on the determination result, configured to perform a synchronization detection of the at least one neighboring cell, and acquire the synchronization information of the at least one neighboring cell; and a reporting circuit, configured to report the synchronization information of the at least one neighboring cell to a base station by an RRC signaling.

In some embodiments, the determining circuitry includes: a receiving sub-circuitry, configured to receive an RRC signaling from the base station, wherein the RRC signaling indicates what synchronization information of the at least one neighboring cell needs to be reported; and a determining sub-circuitry, configured to determine what synchronization information of the at least one neighboring cell needs to be reported based on the RRC signaling.

In some embodiments, the at least one neighboring cell includes: at least one neighboring cell on one frequency or on a plurality of frequencies.

In some embodiments, In some embodiments, the RRC signaling further indicates predetermined bits configured for reporting the synchronization information of the at least one neighboring cell, and the synchronization information of the at least one neighboring cell that needs to be reported includes at least one following item: whether the at least one neighboring cell being synchronized with a primary cell; whether the at least one neighboring cell being synchronized with a same-frequency serving cell; whether an SS burst set period of the at least one neighboring cell being same with an SS burst set period of the primary cell; whether an SS burst set period of the at least one neighboring cell being same with an SS burst set period of the same-frequency serving cell; whether the at least one neighboring cell being synchronized with each other on a corresponding frequency; and whether the at least one neighboring cell having the same SS burst set period on the corresponding frequency.

In some embodiments, the synchronization information of the at least one neighboring cell further includes: a physical cell identifier of the at least one neighboring cell.

In some embodiments, the synchronization information of the at least one neighboring cell includes at least one following item: a list of neighboring cells synchronized with a primary cell, a list of neighboring cells that are not synchronized with the primary cell, and information of time difference between neighboring cells that are not synchronized with the primary cell and the primary cell; a list of neighboring cells synchronized with a same-frequency serving cell, a list of neighboring cells that are not synchronized with the same-frequency serving cell, and information of time difference between neighboring cells that are not synchronized with the same-frequency serving cell and the same-frequency serving cell; a list of neighboring cells having a same SS burst set period with the primary cell, a list of neighboring cells having a different SS burst set period with the primary cell, and SS burst set periods of neighboring cells having the different SS burst set period with the primary cell; a list of neighboring cells having a same SS burst set period with the same-frequency serving cell, a list of neighboring cells having a different SS burst set period with the same-frequency serving cell, and the SS burst set periods of neighboring cells having the different SS burst set period with the same-frequency serving cell; on a corresponding frequency, a list of neighboring cells synchronized with each other, a list of neighboring cells that are not synchronized with each other, and the information of time difference between neighboring cells that are not synchronized with each other; and on a corresponding frequency, a list of neighboring cells having the same SS burst set period, a list of neighboring cells having different SS burst set periods, and SS burst set periods of neighboring cells having different SS burst set periods.

In some embodiments, the information of time difference includes: a combination of a subframe boundary offset, a subframe number difference, and a SFN difference.

Embodiments of the present disclosure provide a computer readable medium, storing computer instructions, wherein once the computer instructions are executed, the method for acquiring synchronization information of at least one neighboring cell is performed.

Embodiments of the present disclosure provide a base station, including a memory and a processor, wherein the memory stores computer instructions executable on the processor, and the processor executes the method for acquiring synchronization information of at least one neighboring cell when executing the computer instructions.

Embodiments of the present disclosure provide a computer readable medium, storing computer instructions, wherein once the computer instructions are executed, the method for reporting synchronization information of at least one neighboring cell is performed.

Embodiments of the present disclosure provide a user equipment, including a memory and a processor, wherein the memory stores computer instructions executable on the processor, and the processor executes the method for reporting synchronization information of at least one neighboring cell when executing the computer instructions.

Embodiments of the present disclosure have the following benefits.

In embodiments of the present disclosure, the RRC signaling is transmitted to the UE to request the UE to report the synchronization information of the at least one neighboring cell. And the base station receives the synchronization information of the at least one neighboring cell from the UE through the RRC signaling. Therefore, the base station can obtain the synchronization information of the at least one neighboring cell, and the synchronization information is used in a subsequent measurement configuration process of other UEs, which may speed up measurement of the at least one neighboring cell by other UEs and reduce measurement overhead of other UEs.

DETAILED DESCRIPTION

In many scenarios, the base station cannot know whether the neighboring cell on a certain frequency is synchronized with the serving cell where the UE resides, and cannot provide synchronization indication information to the UE, which causes the UE to be unable to acquire the synchronization indication information even if the neighboring cell is synchronized with the serving cell. Therefore, the UE still needs to read the NR-PBCH of the neighboring cell, which causes high measurement overhead.

In embodiments of the present disclosure, the RRC signaling is transmitted to the UE to request the UE to report the synchronization information of the at least one neighboring cell, and then the base station receives the synchronization information reported from the UE about the at least one neighboring cell through the RRC signaling. Therefore, the base station can obtain the synchronization information of the at least one neighboring cell, which may reduce measurement overhead of other UEs.

In order that the above objects, characteristics and advantages of the present disclosure become more apparent, and embodiments of the present disclosure are described in detail with reference to the drawings.

Figure 1:
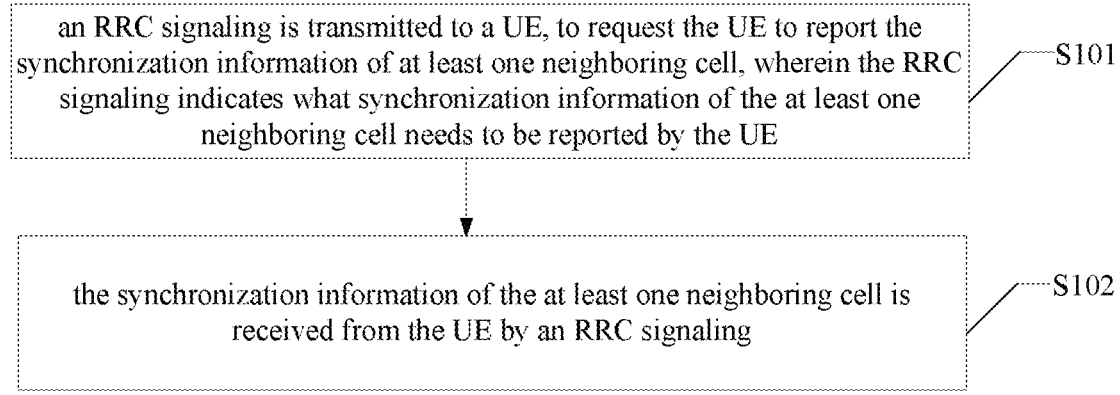
FIG. 1 schematically illustrates a flow diagram of a method for acquiring synchronization information of at least one neighboring cell according to an embodiment of the present disclosure.

Referring to FIG. 1, a method of a flow diagram of a method for acquiring synchronization information of at least one neighboring cell, and the method includes following steps.

In S101, an RRC signaling is transmitted to a UE, to request the UE to report the synchronization information of at least one neighboring cell, wherein the RRC signaling indicates what synchronization information of the at least one neighboring cell needs to be reported by the UE.

In some embodiments, since the base station cannot acquire the synchronization information of the at least one neighboring cell of the UE, the base station transmits the RRC signaling to the UE, to request the UE to report the synchronization information of the at least one neighboring cell. The RRC signaling indicates what synchronization information of the at least one neighboring cell needs to be reported by the UE. The UE performs a synchronization detection on the at least one neighboring cell according to the RRC signaling, and reports the detection result to the base station through the RRC signaling.

In some embodiments, the at least one neighboring cell may include at least one neighboring cell on one frequency or on a plurality of frequencies. The RRC signaling may indicate the frequency of the at least one neighboring cell only (without indicating a specific identifier of the at least one neighboring cell), and may also indicate one or more frequencies, which is not limited in embodiments of the present disclosure. When the base station only indicates the frequency of the at least one neighboring cell in the RRC signaling, the UE needs to detect all possible neighboring cells, and evaluate whether the detected neighboring cells are synchronized with a serving cell.

In some embodiments, after the UE receives the RRC signaling, for each NR frequency, the UE starts to try to acquire the synchronization information of all potential neighboring cells (that is, neighboring cells that the UE can detect) on the frequency. The UE may detect the at least one neighboring cell on each frequency to acquire the physical cell identifier of each neighboring cell, and the corresponding synchronization information content of the at least one neighboring cell. For example, when detecting a neighboring cell on a corresponding frequency, the UE receives its synchronization signal and a Master Information Block (MIB). For each detected neighboring cell, the UE records its physical cell identifier, SFN and subframe number (or slot number), SS burst set period, and evaluate a time difference between the detected neighboring cell and the serving cell (a primary cell, or a same-frequency serving cell, i.e. the serving cell is same frequency as the neighboring cell).

In some embodiments, the UE may acquire a frame boundary, the SFN, a subframe boundary, and the subframe number of the serving cell and the at least one neighboring cell by detecting a synchronization signal block of the serving cell and the at least one neighboring cell. Therefore, the UE may calculate a subframe boundary offset (in an OFDM symbol, or in a minimum time unit Ts), a subframe number difference, and a SFN difference of the at least one neighboring cell and the serving cell. If two cells have the same SFN, the same subframe number, and aligned subframe boundaries, the two cells are considered to be synchronized. Otherwise, the two cells are not considered to be synchronized. The two cells are not synchronized, which may include following scenarios: the two cells have the same SFN but different subframe numbers; the two cells have different SFNs and subframe numbers; or two cells have the same subframe number but different SFNs.

In some embodiments, the NR system supports one UE to be configured with multiple serving cells, one of which is a primary cell (PCell) and the others are secondary cells (SCells). Therefore, the base station may indicate the UE to report information of predetermined bits through the RRC signaling, wherein predetermined bits information is configured to indicate at least one following item: whether the at least one neighboring cell being synchronized with a primary cell; whether the at least one neighboring cell being synchronized with a same-frequency serving cell; whether an SS burst set period of the at least one neighboring cell being same with an SS burst set period of the primary cell; whether an SS burst set period of the at least one neighboring cell being same with an SS burst set period of the same-frequency serving cell; whether the at least one neighboring cell being synchronized with each other on a corresponding frequency; and whether the at least one neighboring cell having the same SS burst set period on the corresponding frequency.

An advantage of the reporting method is that a signaling overhead is low, because only predetermined bits are needed for indication. A disadvantage is that an amount of information is small, and the base station can only acquire the information of "yes or not" without detailed synchronization information of the at least one neighboring cell.

For example, when it is needed to report whether the at least one neighboring cell is synchronized with the primary cell, predetermined bits are configured to indicate whether the at least one neighboring cell is synchronized with the primary cell, and the bit value "1" represents that the at least one neighboring cell is synchronized with the primary cell, and the bit value "0" represents that the at least one neighboring cell is not synchronized with the primary cell. When it is necessary to report whether an SS burst set period of the at least one neighboring cell is same with an SS burst set period of the primary cell, and whether the at least one neighboring cell has the same SS burst set period on the corresponding frequency, two predetermined bits are configured for indication. In some embodiments, the base station may indicate the UE to report different synchronization information items of the at least one neighboring cell according to requirements.

In some embodiment, in the RRC signaling, when the base station only indicate the UE to detect whether the at least one neighboring cell is synchronized with each other on the corresponding frequency, or whether the at least one neighboring cell has the same SS burst set period on the corresponding frequency, the UE does not need to report the physical cell identifier of the at least one neighboring cell; when the base station indicate the UE to detect whether the at least one neighboring cell is synchronized with a primary cell, whether the at least one neighboring cell is synchronized with a same-frequency serving cell, whether an SS burst set period of the at least one neighboring cell is same with an SS burst set period of the primary cell, or whether an SS burst set period of the at least one neighboring cell is same with an SS burst set period of the same-frequency serving cell, the UE need to report the physical cell identifier of the at least one neighboring cell and the corresponding predetermined bit information.

In some embodiment, the base station may indicate the UE to report the synchronization information of the at least one neighboring cell, wherein the synchronization information includes at least one following item: a list of neighboring cells synchronized with a primary cell, a list of neighboring cells that are not synchronized with the primary cell, and information of time difference between neighboring cells that are not synchronized with the primary cell and the primary cell; a list of neighboring cells synchronized with a same-frequency serving cell, a list of neighboring cells that are not synchronized with the same-frequency serving cell, and information of time difference between neighboring cells that are not synchronized with the same-frequency serving cell and the same-frequency serving cell; a list of neighboring cells having a same SS burst set period with the primary cell, a list of neighboring cells having a different SS burst set period with the primary cell, and SS burst set periods of neighboring cells having the different SS burst set period with the primary cell; a list of neighboring cells having a same SS burst set period with the same-frequency serving cell, a list of neighboring cells having a different SS burst set period with the same-frequency serving cell, and the SS burst set periods of neighboring cells having the different SS burst set period with the same-frequency serving cell; on a corresponding frequency, a list of neighboring cells synchronized with each other, a list of neighboring cells that are not synchronized with each other, and the information of time difference between neighboring cells that are not synchronized with each other; and on a corresponding frequency, a list of neighboring cells having the same SS burst set period, a list of neighboring cells having different SS burst set periods, and SS burst set periods of neighboring cells having different SS burst set periods.

A disadvantage of the reporting method is that the signaling overhead is high. An advantage is that the base station may acquire detailed neighbor synchronization information for a subsequent measurement configuration process. In some embodiments, the base station can select an appropriate reporting method according to the signaling overhead and performance requirements.

In some embodiments, the list of neighboring cells may include a physical cell identifier list of neighboring cells.

In some embodiment, the information of time difference may include: a combination of the subframe boundary offset, the subframe number difference, and the SFN difference. The subframe boundary offset may be represented by an orthogonal frequency division multiplexing (OFDM) symbol or the minimum time unit Ts. The subframe number difference and the SFN difference are both integers.

In S102, the synchronization information of the at least one neighboring cell is received from the UE by an RRC signaling.

In some embodiment, the base station may acquire the synchronization information of the at least one neighboring cell from the UE by receiving synchronization information of the at least one neighboring cell reported by the UE through the RRC signaling. Therefore, the base station may acquire whether the at least one neighboring cell is synchronized with the primary cell, whether the at least one neighboring cell is synchronized with the same-frequency serving cell, and whether the at least one neighboring cells are synchronized with each other and so forth. When measurement parameters are configured for other UEs subsequently, the acquired synchronization information can be configured to reasonably configure the measurement parameters. Therefore, other UEs are guided to detect the at least one neighboring cell in a suitable window, thereby obtaining a good measurement effect and improving a mobility performance of network.

In some embodiments, the base station may transmit the RRC signaling to the UE, to request the UE to report the synchronization information of the at least one neighboring cell, and then the base station receives the synchronization information of the at least one neighboring cell reported from the UE by the RRC signaling. Therefore, the base station may acquire the synchronization information of the at least one neighboring cell, and the synchronization information is configured for a subsequent measurement configuration process of other UEs, which can speed up measurement of the at least one neighboring cell by other UEs and reduce the measurement overhead of other UEs.

Figure 2:
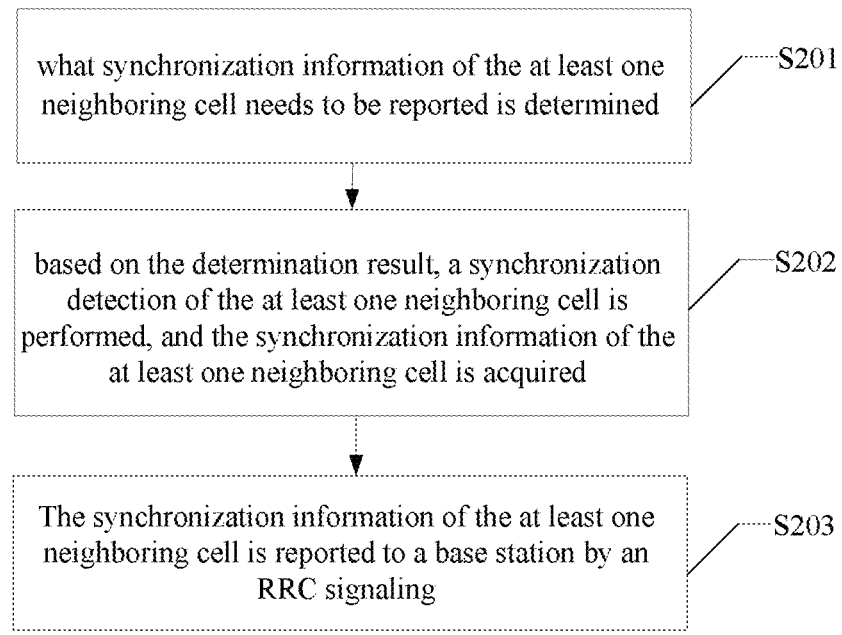
FIG. 2 schematically illustrates a flow diagram of a method for reporting synchronization information of the at least one neighboring cell according to an embodiment of the present disclosure.

A method for reporting synchronization information of the at least one neighboring cell is further provided in embodiments of the present disclosure, as shown in FIG. 2.

Referring to FIG. 2, the method for reporting synchronization information of the at least one neighboring cell may include following steps.

In S201, what synchronization information of the at least one neighboring cell needs to be reported is determined.

In some embodiments, the UE may receive the RRC signaling transmitted from the base station, wherein the RRC signaling indicates what synchronization information of the at least one neighboring cell needs to be reported by the UE. The UE may further determine what synchronization information of the at least one neighboring cell needs to be reported according to the RRC signaling. On the contrary, the UE does not receive the RRC signaling transmitted by the base station, but determines what synchronization information of the at least one neighboring cell needs to be reported by itself. For example, when acquiring available synchronization information, the UE determines to report the synchronization information of the at least one neighboring cell without the RRC indication information transmitted by the base station.

In some embodiments, the at least one neighboring cell may include at least one neighboring cell on one frequency or on a plurality of frequencies. The RRC signaling may indicate the frequency of the at least one neighboring cell only (without indicating a specific identifier of the at least one neighboring cell), and may also indicate one or more frequencies, which is not limited in embodiments of the present disclosure. When the base station only indicates the frequency of the at least one neighboring cell in the RRC signaling, the UE needs to detect all possible neighboring cells, and evaluate whether the detected neighboring cells are synchronized with the serving cell.

In some embodiment, the synchronization information of the at least one neighboring cell that needs to be reported includes at least one following item: whether the at least one neighboring cell being synchronized with a primary cell; whether the at least one neighboring cell being synchronized with a same-frequency serving cell; whether an SS burst set period of the at least one neighboring cell being same with an SS burst set period of the primary cell; whether an SS burst set period of the at least one neighboring cell being same with an SS burst set period of the same-frequency serving cell; whether the at least one neighboring cell being synchronized with each other on a corresponding frequency; and whether the at least one neighboring cell having the same SS burst set period on the corresponding frequency.

An advantage of the reporting method is that a signaling overhead is low, because only predetermined bits are needed for indication. A disadvantage is that an amount of information is small, and the base station can only acquire the information of "yes or "not" without detailed synchronization information of the at least one neighboring cell.

For example, when it is needed to report whether the at least one neighboring cell is synchronized with the primary cell, predetermined bits are configured to indicate whether the at least one neighboring cell is synchronized with the primary cell, and the bit value "1" represents that the at least one neighboring cell is synchronized with the primary cell, and the bit value "0" represents that the at least one neighboring cell is not synchronized with the primary cell. When it is necessary to report whether an SS burst set period of the at least one neighboring cell is same with an SS burst set period of the primary cell, and whether the at least one neighboring cell has the same SS burst set period on the corresponding frequency, two predetermined bits are configured for indication. In some embodiments, the base station may indicate the UE to report different synchronization information items of the at least one neighboring cell according to requirements.

In some embodiment, in the RRC signaling, when the base station only indicate the UE to detect whether the at least one neighboring cell is synchronized with each other on the corresponding frequency, or whether the at least one neighboring cell has the same SS burst set period on the corresponding frequency, the UE does not need to report the physical cell identifier of the at least one neighboring cell; when the base station indicate the UE to detect whether the at least one neighboring cell is synchronized with a primary cell, whether the at least one neighboring cell is synchronized with a same-frequency serving cell, whether an SS burst set period of the at least one neighboring cell is same with an SS burst set period of the primary cell, or whether an SS burst set period of the at least one neighboring cell is same with an SS burst set period of the same-frequency serving cell, the UE need to report the physical cell identifier of the at least one neighboring cell and the corresponding predetermined bit information.

In some embodiment, the base station may indicate the UE to report the synchronization information of the at least one neighboring cell, wherein the synchronization information includes at least one following item: a list of neighboring cells synchronized with a primary cell, a list of neighboring cells that are not synchronized with the primary cell, and information of time difference between neighboring cells that are not synchronized with the primary cell and the primary cell; a list of neighboring cells synchronized with a same-frequency serving cell, a list of neighboring cells that are not synchronized with the same-frequency serving cell, and information of time difference between neighboring cells that are not synchronized with the same-frequency serving cell and the same-frequency serving cell; a list of neighboring cells having a same SS burst set period with the primary cell, a list of neighboring cells having a different SS burst set period with the primary cell, and SS burst set periods of neighboring cells having the different SS burst set period with the primary cell; a list of neighboring cells having a same SS burst set period with the same-frequency serving cell, a list of neighboring cells having a different SS burst set period with the same-frequency serving cell, and the SS burst set periods of neighboring cells having the different SS burst set period with the same-frequency serving cell; on a corresponding frequency, a list of neighboring cells synchronized with each other, a list of neighboring cells that are not synchronized with each other, and the information of time difference between neighboring cells that are not synchronized with each other; and on a corresponding frequency, a list of neighboring cells having the same SS burst set period, a list of neighboring cells having different SS burst set periods, and SS burst set periods of neighboring cells having different SS burst set periods.

A disadvantage of the reporting method is that the signaling overhead is high. An advantage is that the base station may acquire detailed neighbor synchronization information for a subsequent measurement configuration process.

In some embodiments, the list of neighboring cells may include a physical cell identifier list of neighboring cells.

In some embodiment, the information of time difference may include: a combination of the subframe boundary offset, the subframe number difference, and the SFN difference. The subframe boundary offset may be represented by an OFDM symbol or the minimum time unit Ts. The subframe number difference and the SFN difference are both integers.

In S202, based on the determination result, a synchronization detection of the at least one neighboring cell is performed, and the synchronization information of the at least one neighboring cell is acquired.

In some embodiments, for each frequency, the UE may detect the at least one neighboring cell on the frequency to acquire the synchronization information of each potential neighboring cell. For example, when detecting a neighboring cell on a corresponding frequency, the UE receives its synchronization signal and a MIB. For each detected neighboring cell, the UE records its physical cell identifier, SFN and subframe number (or slot number), SS burst set period, and evaluate a time difference between the detected neighboring cell and the serving cell (a primary cell, or a same-frequency serving cell).

In some embodiments, the UE may acquire a frame boundary, the SFN, a subframe boundary, and the subframe number of the serving cell and the at least one neighboring cell by detecting a synchronization signal block of the serving cell and the at least one neighboring cell. Therefore, the UE may calculate a subframe boundary offset (in an OFDM symbol, or in a minimum time unit Ts), a subframe number difference, and a SFN difference of the at least one neighboring cell and the serving cell. If two cells have the same SFN, the same subframe number, and aligned subframe boundaries, the two cells are considered to be synchronized. Otherwise, the two cells are not considered to be synchronized. The two cells are not synchronized, which may include following scenarios: the two cells have the same SFN but different subframe numbers; the two cells have different SFNs and subframe numbers; or two cells have the same subframe number but different SFNs.

In S203, the synchronization information of the at least one neighboring cell is reported to a base station by an RRC signaling.

In some embodiment, the base station may acquire the synchronization information of the at least one neighboring cell from the UE by receiving synchronization information of the at least one neighboring cell reported by the UE through the RRC signaling. Therefore, the base station may acquire whether the at least one neighboring cell is synchronized with the primary cell, whether the at least one neighboring cell is synchronized with the same-frequency serving cell, and whether the at least one neighboring cells are synchronized with each other and so forth. When measurement parameters are configured for other UEs subsequently, the acquired synchronization information can be configured to reasonably configure the measurement parameters. Therefore, other UEs are guided to detect the at least one neighboring cell in a suitable window, thereby obtaining a good measurement effect and improving a mobile performance of network.

In some embodiment, the UE may transmit the synchronization information of the at least one neighboring cell to the base station. Therefore, the base station may acquire the synchronization information of the at least one neighboring cell, and the synchronization information is used in a subsequent measurement configuration process of other UEs, which reduces the measurement overhead.

Figure 3:
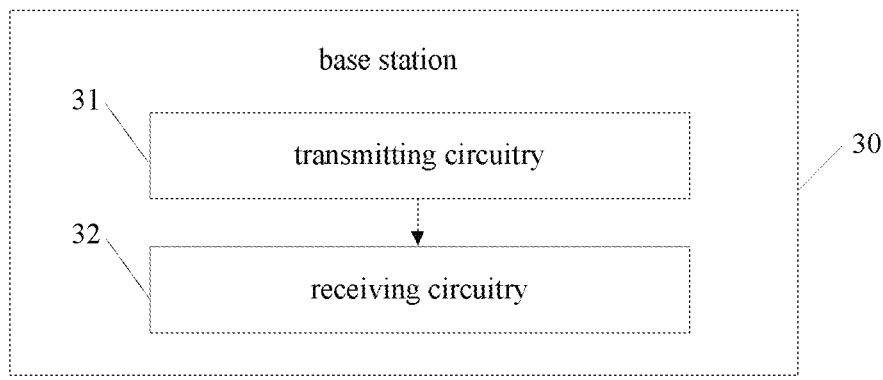
FIG. 3 schematically illustrates a structural diagram of a base station according to an embodiment of the present disclosure.

For those skilled in the art to better understand and implement embodiments of the present disclosure, embodiments of the present disclosure further provide a base station capable of executing the method for acquiring synchronization information of the at least one neighboring cell, as shown in FIG. 3

Referring to FIG. 3, the base station 30 may include: a transmitting circuitry 31 and a receiving circuitry 32.

The transmitting circuitry 31 is configured to transmit an RRC signaling to a UE to request the UE to report the synchronization information of the at least one neighboring cell, wherein the RRC signaling indicates what synchronization information of the at least one neighboring cell needs to be reported by the UE.

The receiving circuitry 32 is configured to receive the synchronization information of the at least one neighboring cell from the UE by an RRC signaling.

In some embodiments, the at least one neighboring cell includes: at least one neighboring cell on one frequency or on a plurality of frequencies.

In some embodiments, the RRC signaling further indicates predetermined bits configured for reporting the synchronization information of the at least one neighboring cell, and the synchronization information of the at least one neighboring cell that needs to be reported includes at least one following item: whether the at least one neighboring cell being synchronized with a primary cell; whether the at least one neighboring cell being synchronized with a same-frequency serving cell; whether an SS burst set period of the at least one neighboring cell being same with an SS burst set period of the primary cell; whether an SS burst set period of the at least one neighboring cell being same with an SS burst set period of the same-frequency serving cell; whether the at least one neighboring cell being synchronized with each other on a corresponding frequency; and whether the at least one neighboring cell having the same SS burst set period on the corresponding frequency.

In some embodiments, the synchronization information of the at least one neighboring cell further includes: a physical cell identifier of the at least one neighboring cell.

In some embodiments, the synchronization information of the at least one neighboring cell includes at least one following item: a list of neighboring cells synchronized with a primary cell, a list of neighboring cells that are not synchronized with the primary cell, and information of time difference between neighboring cells that are not synchronized with the primary cell and the primary cell; a list of neighboring cells synchronized with a same-frequency serving cell, a list of neighboring cells that are not synchronized with the same-frequency serving cell, and information of time difference between neighboring cells that are not synchronized with the same-frequency serving cell and the same-frequency serving cell; a list of neighboring cells having a same SS burst set period with the primary cell, a list of neighboring cells having a different SS burst set period with the primary cell, and SS burst set periods of neighboring cells having the different SS burst set period with the primary cell; a list of neighboring cells having a same SS burst set period with the same-frequency serving cell, a list of neighboring cells having a different SS burst set period with the same-frequency serving cell, and the SS burst set periods of neighboring cells having the different SS burst set period with the same-frequency serving cell; on a corresponding frequency, a list of neighboring cells synchronized with each other, a list of neighboring cells that are not synchronized with each other, and the information of time difference between neighboring cells that are not synchronized with each other; and on a corresponding frequency, a list of neighboring cells having the same SS burst set period, a list of neighboring cells having different SS burst set periods, and SS burst set periods of neighboring cells having different SS burst set periods.

In some embodiments, the information of time difference includes: a combination of a subframe boundary offset, a subframe number difference, and a SFN difference.

In some embodiments, a working process and a principle of the base station 30 may refer to the description in the method for acquiring synchronization information of at least one neighboring cell, and are not described here.

Embodiments of the present disclosure provide a computer readable medium, storing computer instructions, wherein once the computer instructions are executed, the method for acquiring synchronization information of at least one neighboring cell is performed.

Embodiments of the present disclosure provide a base station, including a memory and a processor, wherein the memory stores computer instructions executable on the processor, and the processor executes the method for acquiring synchronization information of at least one neighboring cell when executing the computer instructions.

Figure 4:
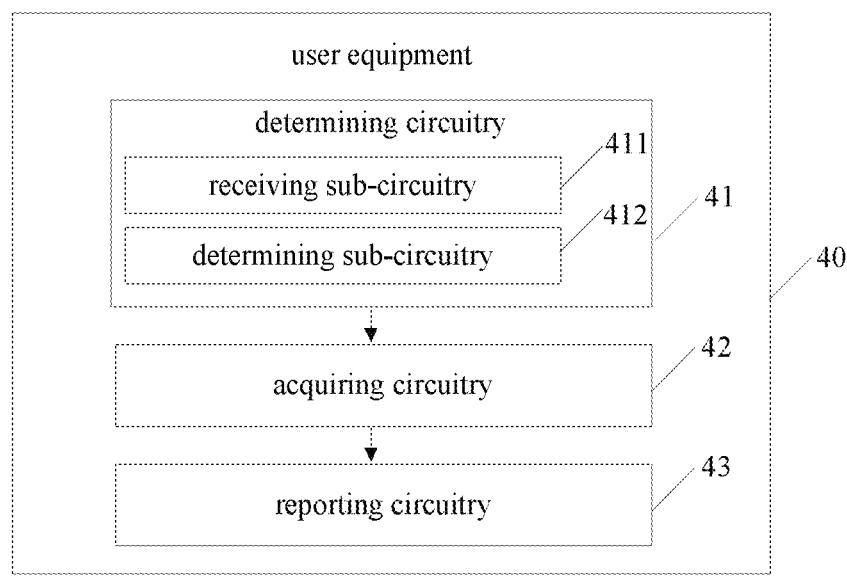
FIG. 4 schematically illustrates a structural diagram of a UE according to an embodiment of the present disclosure.

For those skilled in the art to better understand and implement embodiments of the present disclosure, embodiments of the present disclosure further provide a user equipment capable of executing the method for reporting synchronization information of the at least one neighboring cell, as shown in FIG. 4.

Referring to FIG. 4, the user equipment 40 may includes: a determining circuitry 41, an acquiring circuitry 42, a reporting circuit 43.

The determining circuitry 41 is configured to determine what synchronization information of the at least one neighboring cell needs to be reported.

The acquiring circuitry 42, based on the determination result, is configured to perform a synchronization detection of the at least one neighboring cell, and acquire the synchronization information of the at least one neighboring cell.

The reporting circuitry 43 is configured to report the synchronization information of the at least one neighboring cell to a base station by an RRC signaling.

In some embodiment, the determining circuitry 41 may include: a receiving sub-circuitry 411 and a determining sub-circuitry 412.

The receiving sub-circuitry is configured to receive an RRC signaling from the base station, wherein the RRC signaling indicates what synchronization information of the at least one neighboring cell needs to be reported.

The determining sub-circuitry is configured to determine what synchronization information of the at least one neighboring cell needs to be reported based on the RRC signaling.

In some embodiments, the at least one neighboring cell includes: at least one neighboring cell on one frequency or on a plurality of frequencies.

In some embodiments, the RRC signaling further indicates predetermined bits configured for reporting the synchronization information of the at least one neighboring cell, and the synchronization information of the at least one neighboring cell that needs to be reported includes at least one following item: whether the at least one neighboring cell being synchronized with a primary cell; whether the at least one neighboring cell being synchronized with a same-frequency serving cell; whether an SS burst set period of the at least one neighboring cell being same with an SS burst set period of the primary cell; whether an SS burst set period of the at least one neighboring cell being same with an SS burst set period of the same-frequency serving cell; whether the at least one neighboring cell being synchronized with each other on a corresponding frequency; and whether the at least one neighboring cell having the same SS burst set period on the corresponding frequency.

In some embodiments, the synchronization information of the at least one neighboring cell further includes: a physical cell identifier of the at least one neighboring cell.

In some embodiments, the synchronization information of the at least one neighboring cell includes at least one following item: a list of neighboring cells synchronized with a primary cell, a list of neighboring cells that are not synchronized with the primary cell, and information of time difference between neighboring cells that are not synchronized with the primary cell and the primary cell; a list of neighboring cells synchronized with a same-frequency serving cell, a list of neighboring cells that are not synchronized with the same-frequency serving cell, and information of time difference between neighboring cells that are not synchronized with the same-frequency serving cell and the same-frequency serving cell; a list of neighboring cells having a same SS burst set period with the primary cell, a list of neighboring cells having a different SS burst set period with the primary cell, and SS burst set periods of neighboring cells having the different SS burst set period with the primary cell; a list of neighboring cells having a same SS burst set period with the same-frequency serving cell, a list of neighboring cells having a different SS burst set period with the same-frequency serving cell, and the SS burst set periods of neighboring cells having the different SS burst set period with the same-frequency serving cell; on a corresponding frequency, a list of neighboring cells synchronized with each other, a list of neighboring cells that are not synchronized with each other, and the information of time difference between neighboring cells that are not synchronized with each other; and on a corresponding frequency, a list of neighboring cells having the same SS burst set period, a list of neighboring cells having different SS burst set periods, and SS burst set periods of neighboring cells having different SS burst set periods.

In some embodiments, the information of time difference includes: a combination of a subframe boundary offset, a subframe number difference, and a SFN difference.

In some embodiments, a working process and a principle of the user equipment 40 may refer to the description in the method for acquiring synchronization information of at least one neighboring cell, and are not described here.

Embodiments of the present disclosure provide a computer readable medium, storing computer instructions, wherein once the computer instructions are executed, and the method for reporting synchronization information of at least one neighboring cell is performed.

Embodiments of the present disclosure provide a user equipment, including a memory and a processor, wherein the memory stores computer instructions executable on the processor, and the processor executes the method for reporting synchronization information of at least one neighboring cell when executing the computer instructions.

Those skilled in the art may understand that all or part of steps of above methods may be completed by relevant hardware once the program instruction are executed, and the program may be storage in a computer readable storage medium, such as a Read-Only memory (ROM), a Random Access Memory (RAM), a magnetic disk or an optical disk.

Although the present disclosure has been disclosed above with reference to preferred embodiments thereof, it should be understood that the disclosure is presented by way of example only, and not limitation. Those skilled in the art may modify and vary the embodiments without departing from the spirit and scope of the present disclosure.

What is claimed is:

1. A method for acquiring synchronization information of at least one neighboring cell, comprising:
   transmitting a radio resource control (RRC) signaling to a user equipment (UE) to request the UE to report the synchronization information of the at least one neighboring cell, wherein the RRC signaling indicates what synchronization information of the at least one neighboring cell needs to be reported by the UE; and
   receiving the synchronization information of the at least one neighboring cell from the UE by an RRC signaling,
   wherein the synchronization information of the at least one neighboring cell comprises at least one following group:
   a first group comprising a list of neighboring cells synchronized with a primary cell, a list of neighboring cells that are not synchronized with the primary cell, and information of time difference between neighboring cells that are not synchronized with the primary cell and the primary cell;
   a second group comprising a list of neighboring cells synchronized with a same-frequency serving cell, a list of neighboring cells that are not synchronized with the same-frequency serving cell, and information of time difference between neighboring cells that are not synchronized with the same-frequency serving cell and the same-frequency serving cell;

a third group comprising a list of neighboring cells having a same SS burst set period with the primary cell, a list of neighboring cells having a different SS burst set period with the primary cell, and SS burst set periods of neighboring cells having the different SS burst set period with the primary cell;

a fourth group comprising a list of neighboring cells having a same SS burst set period with the same-frequency serving cell, a list of neighboring cells having a different SS burst set period with the same-frequency serving cell, and the SS burst set periods of neighboring cells having the different SS burst set period with the same-frequency serving cell;

a fifth group comprising a list of neighboring cells synchronized with each other, a list of neighboring cells that are not synchronized with each other, and the information of time difference between neighboring cells that are not synchronized with each other, on a corresponding frequency; or a sixth group comprising a list of neighboring cells having the same SS burst set period, a list of neighboring cells having different SS burst set periods, and SS burst set periods of neighboring cells having different SS burst set periods, on a corresponding frequency.

2. The method according to claim 1, wherein the at least one neighboring cell comprises: at least one neighboring cell on one frequency or on a plurality of frequencies.

3. The method according to claim 1, wherein the RRC signaling further indicates predetermined bits configured for reporting the synchronization information of the at least one neighboring cell, and the synchronization information of the at least one neighboring cell that needs to be reported comprises at least one following item:

whether the at least one neighboring cell being synchronized with a primary cell;

whether the at least one neighboring cell being synchronized with a same-frequency serving cell;

whether a synchronization signal (SS) burst set period of the at least one neighboring cell being same with an SS burst set period of the primary cell;

whether an SS burst set period of the at least one neighboring cell being same with an SS burst set period of the same-frequency serving cell;

whether the at least one neighboring cell being synchronized with each other on a corresponding frequency; and whether the at least one neighboring cell having the same SS burst set period on the corresponding frequency.

4. The method according to claim 3, wherein the synchronization information of the at least one neighboring cell further comprises: a physical cell identifier of the at least one neighboring cell.

5. The method according to claim 1, wherein the information of time difference comprises: a combination of a subframe boundary offset, a subframe number difference, and a system frame number (SFN) difference.

6. A method for reporting synchronization information of at least one neighboring cell, comprising:

determining what synchronization information of the at least one neighboring cell needs to be reported;

based on the determination result, performing a synchronization detection of the at least one neighboring cell, and acquiring the synchronization information of the at least one neighboring cell; and reporting the synchronization information of the at least one neighboring cell to a base station by a radio resource control (RRC) signaling, wherein the synchronization information of the at least one neighboring cell comprises at least one following group:

a first group comprising a list of neighboring cells synchronized with a primary cell, a list of neighboring cells that are not synchronized with the primary cell, and information of time difference between neighboring cells that are not synchronized with the primary cell and the primary cell;

a second group comprising a list of neighboring cells synchronized with a same-frequency serving cell, a list of neighboring cells that are not synchronized with the same-frequency serving cell, and information of time difference between neighboring cells that are not synchronized with the same-frequency serving cell and the same-frequency serving cell;

a third group comprising a list of neighboring cells having a same SS burst set period with the primary cell, a list of neighboring cells having a different SS burst set period with the primary cell, and SS burst set periods of neighboring cells having the different SS burst set period with the primary cell;

a fourth group comprising a list of neighboring cells having a same SS burst set period with the same-frequency serving cell, a list of neighboring cells having a different SS burst set period with the same-frequency serving cell, and the SS burst set periods of neighboring cells having the different SS burst set period with the same-frequency serving cell;

a fifth group comprising a list of neighboring cells synchronized with each other, a list of neighboring cells that are not synchronized with each other, and the information of time difference between neighboring cells that are not synchronized with each other, on a corresponding frequency; or a sixth group comprising a list of neighboring cells having the same SS burst set period, a list of neighboring cells having different SS burst set periods, and SS burst set periods of neighboring cells having different SS burst set periods, on a corresponding frequency.

7. The method according to claim 6, wherein determining what synchronization information of the at least one neighboring cell needs to be reported comprises:

receiving an RRC signaling from the base station, wherein the RRC signaling indicates what synchronization information of the at least one neighboring cell needs to be reported; and determining what synchronization information of the at least one neighboring cell needs to be reported based on the RRC signaling.

8. The method according to claim 6, wherein the at least one neighboring cell comprises: at least one neighboring cell on one frequency or on a plurality of frequencies.

9. The method according to claim 6, wherein the RRC signaling further indicates predetermined bits configured for reporting the synchronization information of the at least one neighboring cell, and the synchronization information of the at least one neighboring cell that needs to be reported comprises at least one following item:

whether the at least one neighboring cell being synchronized with a primary cell;

whether the at least one neighboring cell being synchronized with a same-frequency serving cell;

whether a synchronization signal (SS) burst set period of the at least one neighboring cell being same with an SS burst set period of the primary cell;

whether an SS burst set period of the at least one neighboring cell being same with an SS burst set period of the same-frequency serving cell;

whether the at least one neighboring cell being synchronized with each other on a corresponding frequency; and whether the at least one neighboring cell having the same SS burst set period on the corresponding frequency.

10. The method according to claim 9, wherein the synchronization information of the at least one neighboring cell further comprises: a physical cell identifier of the at least one neighboring cell.

11. The method according to claim 6, wherein the information of time difference comprises: a combination of a subframe boundary offset, a subframe number difference, and a system frame number (SFN) difference.

12. The method according to claim 7, wherein the at least one neighboring cell comprises: at least one neighboring cell on one frequency or on a plurality of frequencies.

13. The method according to claim 7, wherein the RRC signaling further indicates predetermined bits configured for reporting the synchronization information of the at least one neighboring cell, and the synchronization information of the at least one neighboring cell that needs to be reported comprises at least one following item:

whether the at least one neighboring cell being synchronized with a primary cell;

whether the at least one neighboring cell being synchronized with a same-frequency serving cell;

whether a synchronization signal burst set period of the at least one neighboring cell being same with an SS burst set period of the primary cell;

whether an SS burst set period of the at least one neighboring cell being same with an SS burst set period of the same-frequency serving cell;

whether the at least one neighboring cell being synchronized with each other on a corresponding frequency; and whether the at least one neighboring cell having the same SS burst set period on the corresponding frequency.

14. The method according to claim 13, wherein the synchronization information of the at least one neighboring cell further comprises: a physical cell identifier of the at least one neighboring cell.

\* \* \* \* \*